May 22, 1928.

W. C. WOODSON, JR 1,670,792

METHOD OF AND APPARATUS FOR CHECKING THE CONNECTIONS OF WATTHOUR
METERS TO THE INSTRUMENT TRANSFORMERS AND TO THE LINE

Filed Sept. 1, 1927      6 Sheets-Sheet 1

Inventor
William C. Woodson, Jr.

By
J. Kaplan
Attorney

May 22, 1928.  1,670,792
W. C. WOODSON, JR
METHOD OF AND APPARATUS FOR CHECKING THE CONNECTIONS OF WATTHOUR
METERS TO THE INSTRUMENT TRANSFORMERS AND TO THE LINE
Filed Sept. 1, 1927  6 Sheets-Sheet 2

Inventor
William C. Woodson, Jr.

By J. Kaplan
Attorney

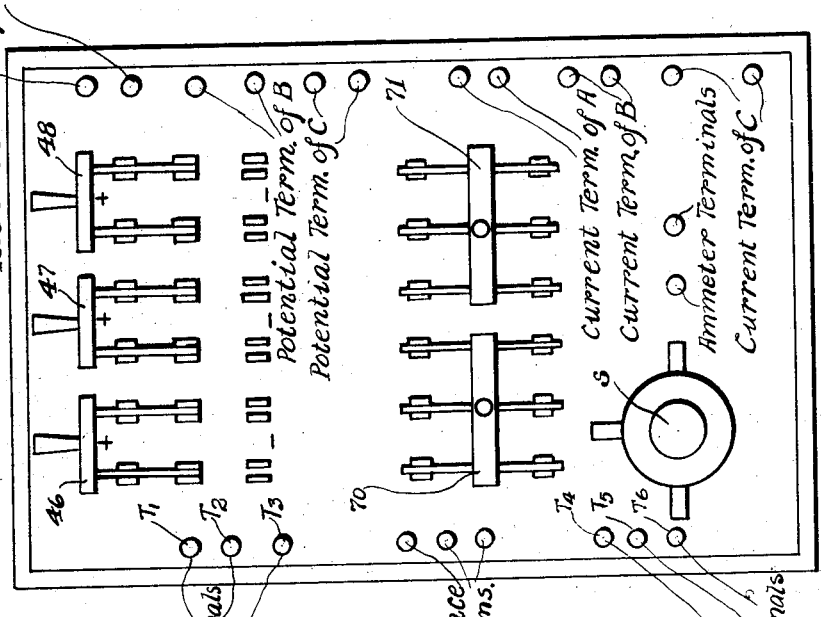
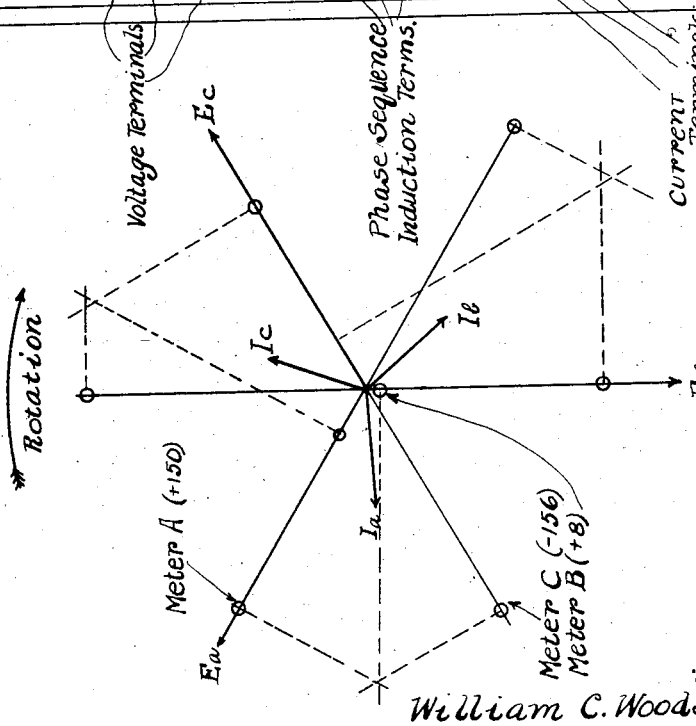

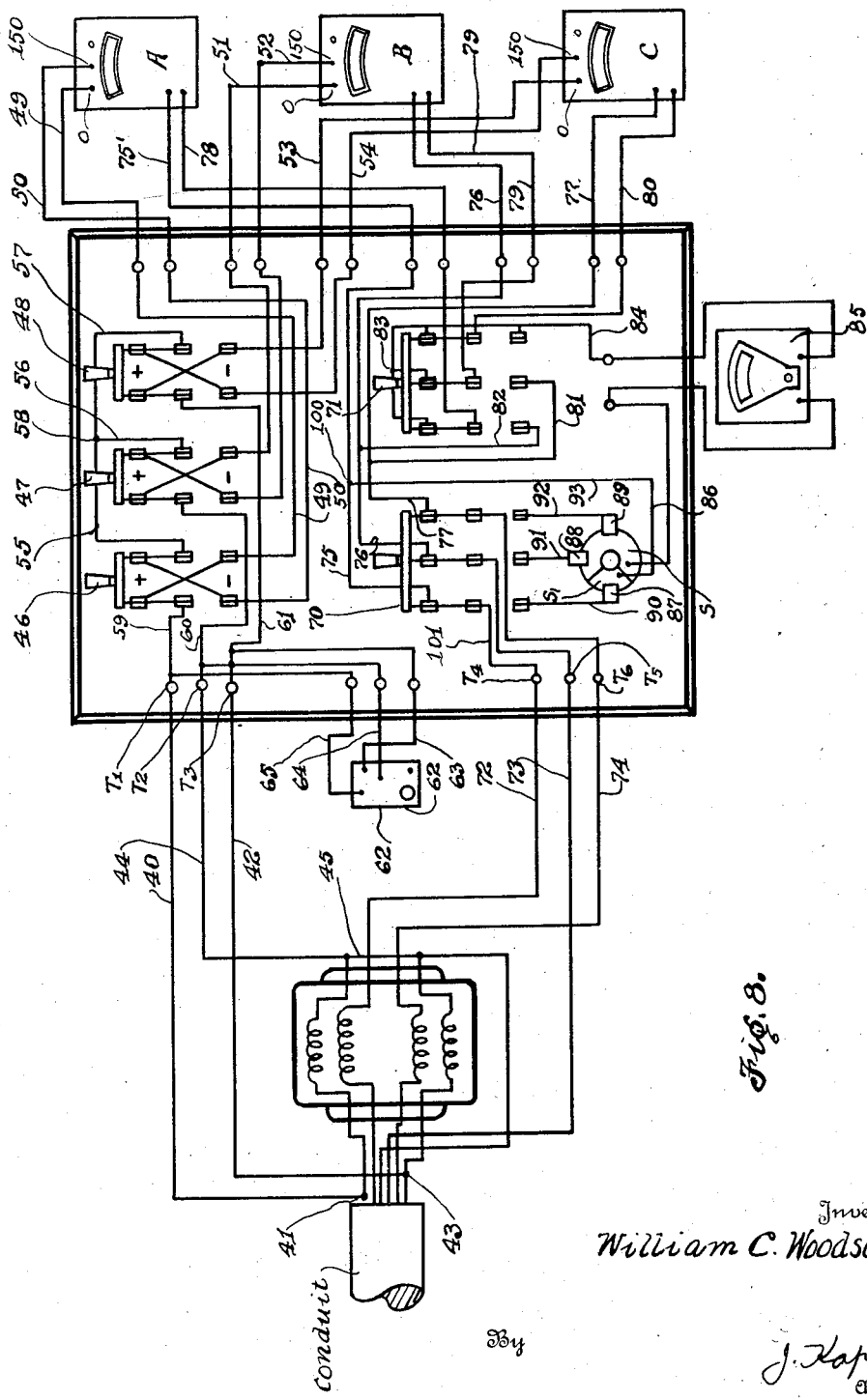

May 22, 1928. 1,670,792
W. C. WOODSON, JR
METHOD OF AND APPARATUS FOR CHECKING THE CONNECTIONS OF WATTHOUR
METERS TO THE INSTRUMENT TRANSFORMERS AND TO THE LINE
Filed Sept. 1, 1927  6 Sheets-Sheet 5

Inventor
William C. Woodson, Jr.
By J. Kaplan
Attorney

May 22, 1928.
W. C. WOODSON, JR
1,670,792
METHOD OF AND APPARATUS FOR CHECKING THE CONNECTIONS OF WATTHOUR
METERS TO THE INSTRUMENT TRANSFORMERS AND TO THE LINE
Filed Sept. 1, 1927    6 Sheets-Sheet 6
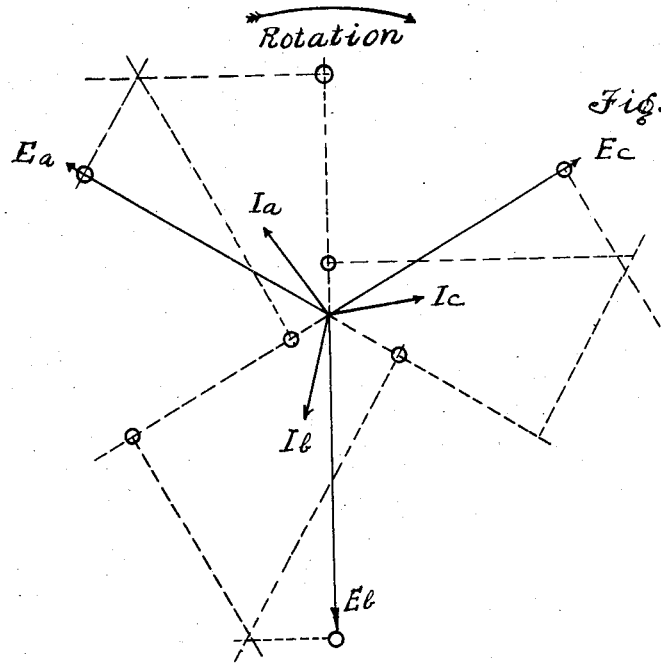
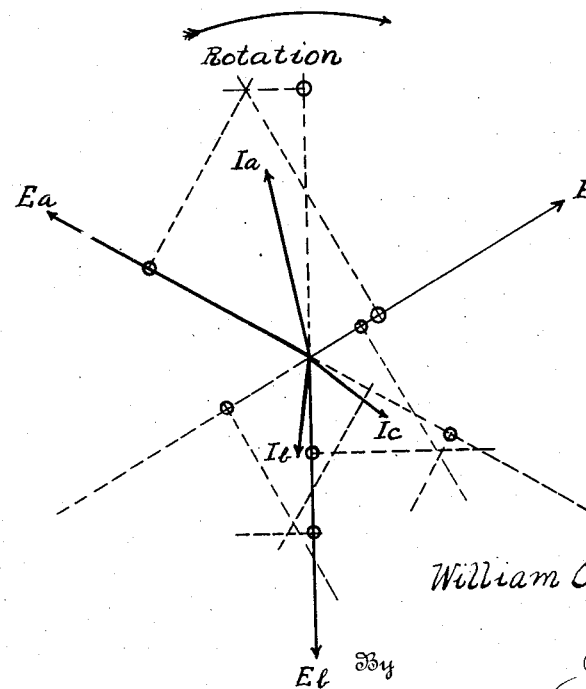
Inventor
William C. Woodson, Jr.
By J. Kaplan
Attorney Patented May 22, 1928.

1,670,792

UNITED STATES PATENT OFFICE.

WILLIAM COWPER WOODSON, JR., OF BROOKLYN, NEW YORK.

METHOD OF AND APPARATUS FOR CHECKING THE CONNECTIONS OF WATT-HOUR METERS TO THE INSTRUMENT TRANSFORMERS AND TO THE LINE.

Application filed September 1, 1927. Serial No. 216,886.

In three-phase high tension power transmission, watthour meters are connected to two lines of the phase at two lines of the three-phase transmission lines by means of instrument transformers which serve to step down the voltage and the current in definite ratios from the line to the watthour meter. In such systems two potential transformers and two current transformers are used. This requires eight lines to be run from the transformers to the watthour meters. The watthour meter may be placed from 10 to 500 feet away from the instrument transformers and the wires are nearly always concealed in a conduit and cannot be visually traced. Each of the eight wires must connect to some specific terminal of the meter. In case a wire is connected to the wrong terminal, it will result in the meter recording either slower or faster than it should. In many instances such wrong connections have been found after causing incorrect metering for a long period of time. This has been a great source of annoyance to public utility companies and has also been a great source of loss in revenue for the reason that in most instances such wrong connections result in the meter operating at a slower rate than the power consumption. Hitherto in many instances the only possible way to check the wiring of such a meter was to kill the high tension line and ring out the wire. It is always undesirable and expensive and frequently impossible to have the line killed for the purpose of testing out the connections of the watthour meter to the current transformers and to the line.

It is the object of the present invention to provide a system, a method and an apparatus whereby the connections of the watthour meter to the instrument transformers and to the line may be properly checked and gone over without interfering with the operation of the load, without killing the high power line and without in any way interfering with the connections between the watthour meter, the instrument transformers and the high power line.

A further object of the invention is to provide a method and apparatus whereby an unskilled person may perform a predetermined number of routine tests and observations which are subsequently utilized for determining whether or not the watthour meter is properly connected and which may also serve to determine the specific error in the connections.

In accordance with the present invention a portable apparatus is utilized which may be readily connected to the watthour meter of any desired installation. A series of predetermined tests and observations are made by any unskilled person and recorded. The data gathered by these tests are then utilized for drawing vector diagrams which will indicate wrong connections or defects in the transformers. In making these tests the power demand and power factor of all three phases are also incidentally determined.

The system, method and apparatus which constitutes the subject-matter of the present invention will be more clearly understood from the accompanying drawings and the following specification.

In the drawings:

Figure 7 is a vector diagram which gives the phase relationship between the currents and voltages in each of the three phases of the three-phase line as based upon the second series of observations.

Figure 8 is a diagrammatic showing of the apparatus as actually utilized in the tests.

Figure 9 shows the portable switch board.

Figures 10, 11 and 12 are vector diagrams of three specific cases which will be discussed in a later portion of this specification.

The fundamental principle of the present invention lies in the dividing of the three-phase metering system into three single phase units. For this purpose three single-phase indicating wattmeters are used and for one set of observerations are connected one in each phase. When the system operates at unity power factor, the current and potential elements of the single-phase unit are in phase. When the system operates at any other power factor, the phase displacement beween the potential and current elements of each single-phase unit is equal to the power factor in that particular phase.

Figure 1:
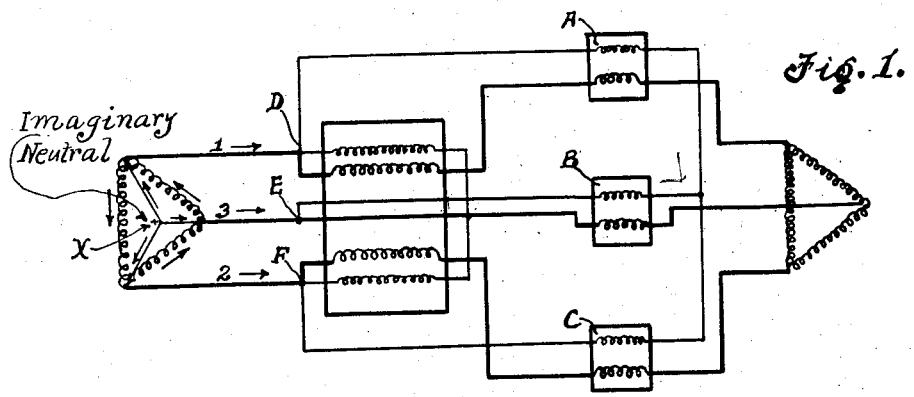
Figure 1 is a diagrammatic showing of the basic principle involved in the present method.

For the purpose of facilitating the understanding of the present invention, Figure 1 is drawn without any instrument transformers and illustrates the principle of operation of one set of observations made by the present method. This diagram shows a high tension three-phase generator having an imaginary neutral X and three distribution lines 1, 2 and 3. The watthour meter is provided with two potential coils, one of which is connected across the lines 1 and 3 and the other of which is connected across the lines 2 and 3, the two current coils, one of which is in series with line 1 and the other of which is in series with line 2. Three single-phase indicating wattmeters A, B and C are connected, one in each phase, and are interposed between the wattmeter and the load. The current coils of the wattmeters A and C are in series with the current coils of the watthour meters shown in the drawing whereas the current coil of the wattmeter B is in line 3. One end of each of the potential coils of the indicating wattmeters are connected to each other, the other ends of the potential coils being connected to the points D, E and F on the lines 1, 2 and 3 respectively, these points being disposed on the power side of the watthour meter. The three potential coils in the three indicating wattmeters are, it will be seen, connected in star across the three-phase line. For the accurate operation of the present method it is important that the three single-phase indicating wattmeters have the same reactance and resistance in the potential coils in order to have a balanced star connection. It is obvious that when such is the case the resultant current in these three potential coils will be zero and no neutral return connections are necessary.

Figures 2, 3:
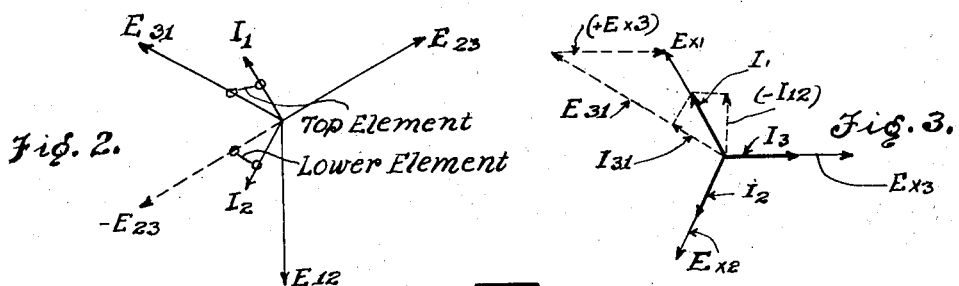
Figure 2 is a vector representation of the current and voltage relationship in the watthour meter.
Figure 3 is a similar representation of the current and voltage relationships in the three indicating wattmeters which are utilized in the present system.

Figure 2 shows a vector diagram which indicates the phase relation between the potential and current elements in the three-phase watthour meter. The line $E_{12}$ represents the voltage from the main line 1 to the main line 2. The line $E_{31}$ represents the voltage from main line 3 to main line 1 and the line $E_{23}$ represents the voltage from main line 2 to main line 3. The line $I_1$ represents the current in the upper current element of the watthour meter and the line $I_2$ represents the current to the lower current element of the watthour meter.

The vector diagram shown in Figure 3 indicates the similar phase relationships between the potentials and the currents for the three single-phase indicating meters.

When the three potential coils of the indicating wattmeters A, B and C have identical impedance values and are connected as shown, the potential drop across the three coils will be the same. Such being the case, we may assume an imaginary neutral at X, where $E_{x1} = E_{x2} = E_{x3}$. This represents the voltage drop across the respective potential coils in the single-phase meters. Since the above relation is true, the magnitude of $E_{x1}$ is given by the equation:

$$\frac{E_{31}}{\sqrt{3}} = E_{x1}$$

While the vector relation is given by the equation:

$$-E_{x3} + E_{x1} = E_{31}$$

or $$E_{x1} = E_{31} + E_{x3}$$

This vector addition is shown by the dotted lines in Figure 3.

The current in the top phase is given vectorially by the equation:

$$I_1 = I_{31} - I_{12}$$

This vector addition shows $I_1$ to be in phase with $E_{x1}$ at unity power factor load.

The same analysis will prove $I_2$ to be in phase with $E_{x2}$ and $I_3$ to be in phase with $E_{x3}$ at unity power factor load. Furthermore, each single-phase meter will measure the power being delivered in its respective phase, and the sum of the three indicating meters reading, when translated into watthours should check with the watthour meter. This being true, it is possible to calibrate the meter under operating load while the connection check is being made if it should be desired.

Figure 4:
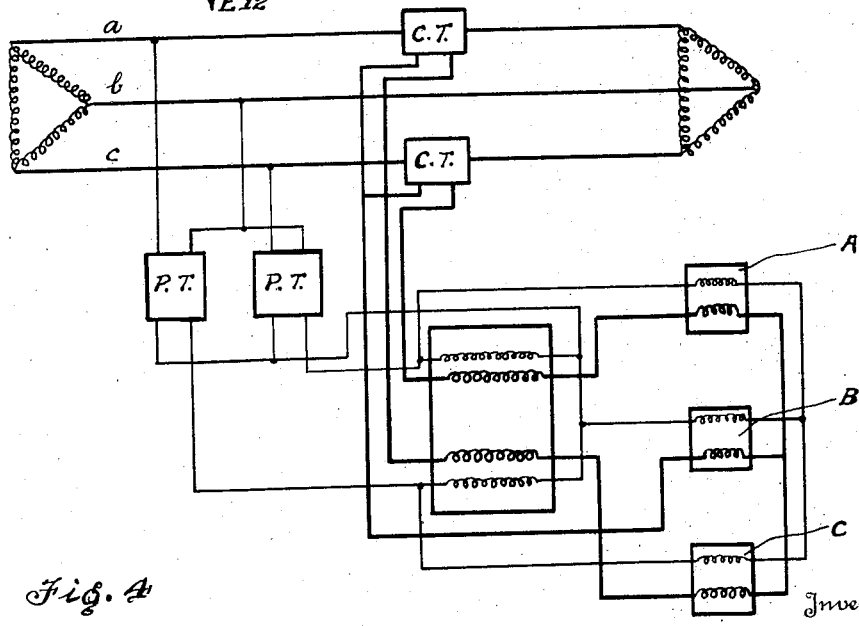
Figure 4 is a diagrammatic showing of the system utilized in the present method of testing where instrument transformers are used for connecting the high voltage lines to the watthour meter, this connection being used for making the first series of observations.

As we are interested only in watthour meters used in conjunction with instrument transformers, Figure 1 serves only as a guide in the principles involved. In Figure 4 is a diagram in which these principles have been transferred to primary metering.

As the current in the secondary common return wire for the current transformers is in phase with the current in the common primary line and bears the same ratio to this as the current transformers bear to their respective lines, the condition in the secondary currents is a reproduction of the primary current on a reduced scale.

As stated above, the sum of the readings of the three single-phase meters will be equal to the registration of the watthour meter when translated into the same units. Also, a study of the diagram will show that the reversal of the polarity of any one of the four instrument transformers or the interchanging of any pair of leads at the meter will cause one of the single phase meters to give a backward indication. This simple test is sufficient for most of the errors that are likely to exist in three phase meter connections.

Whenever one of the indicating meters gives a negative reading, it proves that an instrument transformer is reversed on either the primary or secondary side or that the leads are interchanged at the meter. This is true for any load condition—balanced, unbalanced, lagging or leading power factors.

While a negative reading of any one of the single phase meters will prove a wrong connection exists, positive readings on all three meters does not prove there are no errors in the connections, because there are several combinations of reversed polarity and reversed phases that will give positive readings on all three single-phase meters while the watthour meter will register forward also.

In order to cover all other cases, the present invention contemplates another series of tests that will show up errors which will not be shown up by the preceding test.

Figure 6:
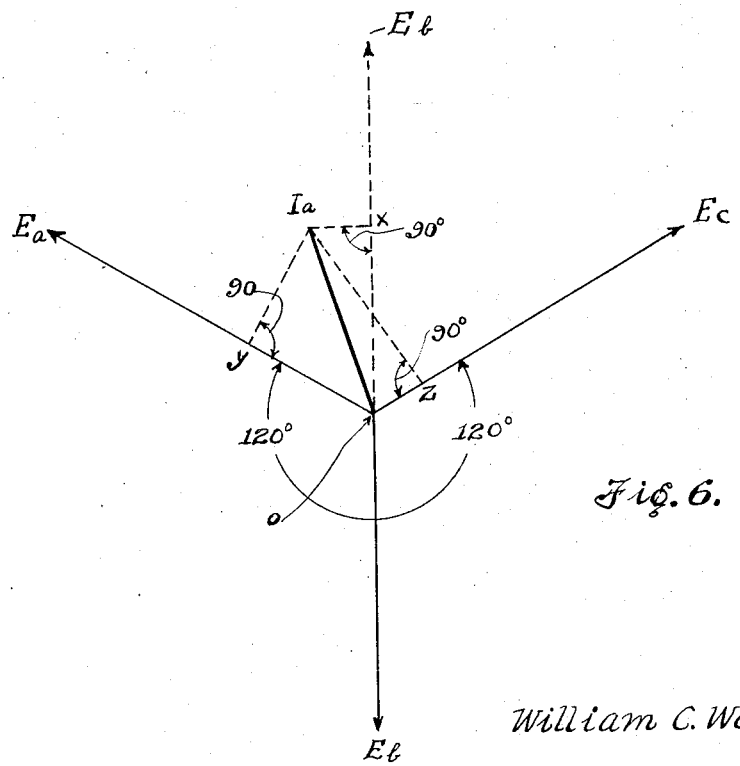
Figure 6 is a vector diagram giving the voltage and current phase relationships which exist in the three single-phase indicating wattmeters, when connected as in Figure 5.

In this test the fact that the three potentials on a three phase system are exactly 120° apart is made use of to develop a vector diagram which can be analyzed by the office engineer for faulty connection. Referring to Figure 6, the three voltages from the phase line to the imaginary neutral are indicated by $E_a$, $E_b$ and $E_c$ which are drawn 120° apart, and also represent the voltages across the potential coils of the three indicating meters.

Figure 5:
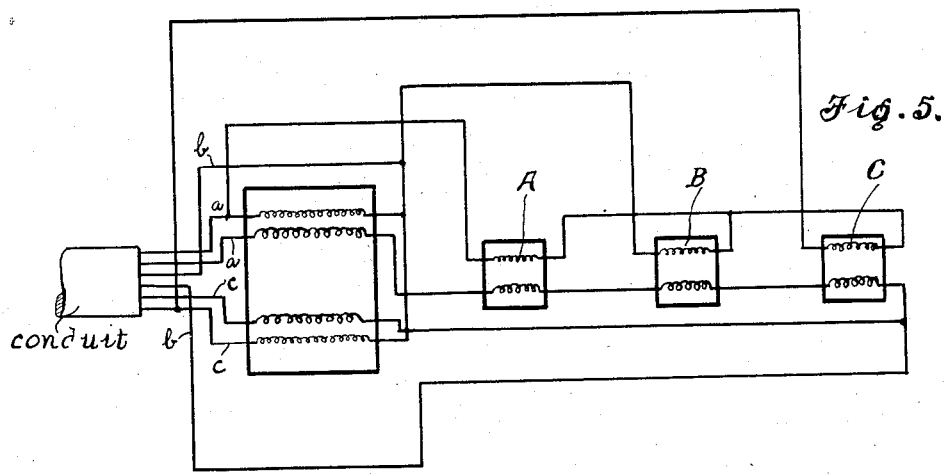
Figure 5 is a diagrammatic showing of the system utilized for making another series of observations.

The current coils of all three meters are connected in series to phase $a\ b$ as shown in Figure 5, but the potential coils are to be left unchanged—each remaining connected to its respective phase. The current marked $I_a$ in the vector diagram, Figure 6, represents the current in the top current coil of the watthour meter. The voltages on the meters A, B and C are $E_a$, $E_b$ and $E_c$ respectively. From the wiring connections at the watthour meters, it is seen that the current $I_a$ and the potential $E_a$ are tied together in the top element of this meter, and these two lines should connect to the same primary phase through their respective instrument transformers, and, if they do not do this, it is apparent that something is wrong in the connections.

Referring to Figure 5 again, it is seen that on meter A is found current $I_a$ and potential $E_a$. If we assume $I_a$ in the vector diagram (Figure 6), to represent the phase angle and magnitude of this current, the reading on the wattmeter A will be equal to OY because this is the component of $I_a$ in phase with $E_a$. Since the current coils of all three meters are in series, $I_a$ is the current in meter B also, but the potential on meter B is $E_b$. Since $I_a$ and $E_b$ are more than 90° out of phase, meter B will give a backward reading, and, to obtain a forward indication, it is necessary to reverse the potential connections at meter B. When this is done we have the vector $-E_b$ for the voltage in the diagram and the reading on meter B is equal to $-OX$ because this is the component of $I_a$ in phase with $-E_b$. In like manner, it is found that OZ is equal to the reading on meter C, because on this meter we have current $I_a$ and potential $E_c$.

In the preceding statements, a vector relation and value were arbitrarily taken for $I_a$. This was done to show the relation that $I_a$ bears to $E_a$, $E_b$ and $E_c$. But when the situation is reversed by starting with the readings of meters A, B and C and working back to find the vector relation of the current, something definite is obtained. When the meters are connected as shown in Figure 5 and the readings of A, B and C are laid off along the vectors $E_a$, $E_b$ and $E_c$ respectively, and perpendicular lines are drawn through these points, it will be found that these three perpendicular lines will all pass through a common point and the current vector when extended must also pass through this common point. In this way the vector relation between the voltage and current on phase A is established.

The vector relations for $I_b$ and $I_c$ are determined in the same manner by connecting the three meters in series on lines $b$ and $c$ repeating the operation for each as was done for line $a$. A completed vector diagram is shown in Figure 7. This diagram was drawn from test results. It will be noted that the perpendiculars represented by the dotted lines do not meet exactly at a common point. This is due to errors in reading instruments and to the fact that the voltage on all three phases is not exactly the same. However, this error is small and has no material effect on results desired. The current magnitude is determined by connecting an ammeter in series with the three current coils of the indicating meters and reading it at the same time the meters A, B and C are read. The values of the meter readings from which the diagram was drawn are shown as follows:

| Current A=3.1 amperes | Current B=3.18 amperes | Current C=3.08 amperes |
|---|---|---|
| Potential A+150<br>Potential B+ 8<br>Potential C−156 | Potential A−182<br>Potential B+142<br>Potential C+ 34 | Potential A+ 31<br>Potential B−166<br>Potential C+127 |

An arrow above the diagram indicates the direction of rotation. This is found by connecting a phase sequence indicator to the circuit at the watthour meter. It is evident that the current $I_a$ is lagging the potential $E_a$ by about 30°. If such a vector were found on a circuit feeding a synchronous motor where it was known the motor was taking a leading power factor, we would at once know the meter was connected improperly because $I_a$ and $E_a$ are tied together at the watthour meter and should bear the same relation as the power factor of the load. If, on the other hand, the load consisted of induction motors, this diagram would prove the meter to be properly connected, because $I_a$ bears a lagging relation to $E_a$ and a leading relation to the other two phases, while an induction motor can take only a lagging current.

In order to expedite and simplify these tests, a small portable switch-board is carried by the tester. A complete connection diagram of this board is shown in Figure 8 and a view of the same board is shown in Figure 9.

The portable test board is provided with two sets of terminals, each set comprising three terminals. One of these sets of terminals is designed for establishing connection between the potential coils of the three single-phase indicating wattmeters A, B and C with the three phases of the distribution system. The other set of terminals is designed to provide connection between the current coils of the single phase indicating wattmeters A, B and C and the three phases of the system. The upper set of terminals $T_1$, $T_2$ and $T_3$ serve to provide the connections for the potential coils. The terminal $T_1$ is connected by means of lead wire 40 to the point 41 disposed between the upper potential coil of the watthour meter and the potential transformer. The terminal $T_3$ is connected by means of wire 42 to the point 43 which is disposed between the lower potential coil of the watthour meter and the potential transformer. The terminal $T_2$ is connected by means of wire 44 to the wire 45 which connects both of the potential coils of the watthour meter. Three two-pole double throw switches 46, 47 and 48 are provided in the upper part of the board for the purpose of controlling the direction of application of the voltage of each phase upon its corresponding potential coil of the corresponding wattmeter. The switch 46 connects by means of wires 49 and 50, with the potential coil of the wattmeter A. The switch 47 connects by means of wires 51 and 52, with the potential coil of the wattmeter B and the switch 48 connects with the wires 53 and 54, with the potential coil of wattmeter C. The wires 55, 56 and 57 are connected together at the point 58 and have their free ends connected to one of the terminal switches 46, 47 and 48 respectively. The other terminal switches 46, 47 and 48 are connected by means of wires 59, 60 and 61 to the terminals $T_1$, $T_2$ and $T_3$ respectively. By this arrangement it will be seen the three potential coils of the wattmeters A, B and C are connected in star and by means of the switches 46, 47 and 48, voltage of each phase may be applied to the potential coils of the wattmeters A, B and C in either direction.

A phase sequence indicator 62 is also connected to the terminals $T_1$, $T_2$ and $T_3$ by means of wires 63, 64 and 65.

The three-pole double throw switches 70 and 71 are provided to control the manner of connection of the current coils of the wattmeters A, B and C. The terminals $T_4$, $T_5$ and $T_6$ are connected to the switch arms of the switch 70, these terminals also being connected by means of wires 72, 73 and 74 to the watthour meter. The wire 72 connects the terminal $T_4$ with the upper current coil of the watthour meter, the wire 74 connects the terminal $T_6$ with the lower current coil of the watthour meter and the wire 73 connects the terminal $T_5$ with the instrument transformer.

The wires 75, 76 and 77 connect the upper set of fixed terminals of the switch 70 with one side of each of the current coils in wattmeters A, B and C. The wires 78, 79 and 80 connect the other ends of the current coils of the wattmeters with the switch blades of the switch 71. The wire 81 connects one of the lower fixed terminals of the switch 71 with the wire 77 and wire 82 connects another of the lower switch terminals of the switch 71 with the wire 76. The three upper terminals of the switch 71 are connected together at the point 83 and are also connected to the third lower terminal of the switch 71 by means of wire 84 which connects with one terminal of an ammeter 85.

The switchboard also carries a rotary switch which controls the manner of connection of the current coils of the indicating wattmeters to the watthour meter. This switch comprises two copper segments S and $S_1$ respectively mounted on an insulating disk. The segment S is approximately twice the size of the segment $S_1$. As the switch is rotated the segment $S_1$ may be brought in contact with any one of the three faces at the contact points 87, 88 or 89 while at the same time the larger segment S connects the other two faces together. The lead wires 86 and 93 which are connected to the two segments of the switch, are flexible and rotate with the switch. The switch is equipped with a stop so that it may turn through only a little more than one-half a revolution or just far enough so that the small segment $S_1$ may be brought in contact with any one of the contacts 87, 88 or 89.

Referring to the diagram in Figure 8, it will be seen that the connections on the transformer side of the watthour meter are not disturbed when making a connection check, as the test board is connected to the ground side of the meter. This eliminates the possibility of the tester reconnecting the meter improperly after he has completed the test. The purpose of the three, two-pole, double throw (heel and toe) switches is to control the three currents. The three-pole current switches are so designed that the secondary of the current transformers cannot be opened when the switches are operated. When all five switches are closed upward, as in the diagram, the connections are the same as in Figure 4 and when all three meters are closed downward, the connections are the same as in Figure 5. The small circular switch S in the lower left-hand corner is used to connect the three meters A, B and C in series to any one of the three phases. With the series connection, at least one of the wattmeters will give a backward indication. Then, by reversing the potential switch at the top of the board, a positive deflection on the meter is obtained. The potential switches are marked with positive and negative signs, and a positive or negative sign must be placed in front of the meter reading—depending upon the sign toward which the switch is closed. When laying off negative readings on the vector diagram the magnitude is unchanged, but it must be in exact opposite direction to the positive direction of the voltage vector to which it belongs.

When making the tests the meterman goes through the following routine:

(1) Connects up apparatus according to diagram in Figure 8.

(2) With all switches closed upward, reads meters A, B and C, placing proper sign in front of reading, as explained above. (If any reading is negative, the watthour meter is incorrectly connected to the instrument transformer.)

(3) Closes the two current switches downward, setting the small circular switch for current in "A". Reads meters A, B and C and ammeter. (At least one of the wattmeters should give a negative reading.)

(4) Repeats (3), measuring current in "B".

(5) Repeats (3), measuring current in "C".

(6) Takes reading on phase sequence indicator for direction of rotation.

(7) Ascertains the nature of the load the meter controls. If the installation consists of a synchronous motor load, it will be necessary to know if the power factor is leading or lagging.

When test number 2 is conducted, all of the switches are closed upward in the manner shown in Figure 8. Under these conditions the potential coil of the wattmeters A, B and C are connected in star having their common point of connection at the point 58 and the other ends of the potential coils are connected to points 41, 45 and 43.

The connection of the potential coil of wattmeter A may be traced as follows: Beginning with point 56, the circuit follows the wire 55, switch 46, wire 50 to the 150 volt terminal of the potential coil of the wattmeter A. The zero terminal of the potential coil is connected by means of wire 49, switch 46, wires 59 and 40 to the point 41.

The 150 volt terminal of the potential coil of the wattmeter B is connected to the common point 58 by means of wire 52, switch 47, and wire 56 to the point 58. The zero terminal of the potential coil is connected by means of wire 51, switch 47 and wires 60 and 44 to the point 45 on the watthour meter.

The 150 volt terminal of the potential coil of the wattmeter C is connected to the point 58 by means of wire 54, switch 48 and wire 57. The zero volt terminal of the same potential coil is connected by means of wire 53, switch 48 and wires 61 and 42 to the point 43.

The current coils of the wattmeters are also connected in star, being connected together at the common point 83, the other ends of the current coils being connected in each phase.

The upper terminal of the current coil of the wattmeter A is connected in series with the upper current coil of the watthour meter by means of the wires 75', 75, the switch 70, wire 101, terminal $T_4$ and wire 72. The lower terminal of the same coil is connected to the point 83 by means of wire 78, and switch 71.

The upper terminal of the current coil of the wattmeter B is connected to one of the terminals of the current transformer by wire 76, switch 70, terminal $T_5$ and wire 73. The lower terminal of this current coil is connected to the common point 73 by wire 79 and switch 71.

The upper terminal of the current coil of the wattmeter C is connected to the lower current coil of the watthour meter by wire 77, switch 70, terminal $T_6$ and wire 74. The lower terminal of this coil is connected to the point 83 by wire 80 and switch 71.

After having made the proper connections and placing all switches in the positions shown in Figure 8, the meterman records the readings of the wattmeters A, B and C. If any one of the wattmeters gives a negative indication, the corresponding switch 46, 47 or 48 is thrown to its negative position and the positive reading of the wattmeters is then taken. The meterman, however, makes a negative indication against a reading of the wattmeter whose switch 46, 47 or 48 as the case may be, is in the negative position. If in this test it becomes necessary to throw one of the switches 46, 47 or 48 into the negative position, it is an indication that the polarity of one of the transformer connections or one of the other meter connections is wrong and such connection must be reversed.

If, however, all of the wattmeters A, B and C give positive readings in accord with the switches in the position shown in Figure 8, there still is a possibility that some of the connections are erroneous. For this purpose another set of observations must be made. This second set of observations are made in accordance with the instructions 3, 4 and 5. For this test the switches 70 and 71 are thrown into the positions in which they engage with the lower set of terminals. When the switch S is in the position indicated in Figure 8, the three current coils of the wattmeters A, B and C are in series with each other and in series with phase A. The circuit which includes the current coils of the wattmeters under these conditions may be traced as follows: wire 72, terminal $T_4$, wire 101, switch 70, wire 90, terminal 87 of the rotatable switch S, rotary contact arm $S_1$, wire 93, point 100, wire 75', current coil of wattmeter A, wire 78, switch 71, wire 82, wire 76 to the upper terminal of the current coil of wattmeter B, through the current coil of wattmeter B, wire 79, switch 70, wire 81, wire 77, to the upper terminal of the current coil of wattmeter C, current coil of wattmeter C, wire 80, switch 71, wire 84, ammeter 85, wire 86, switch S, terminal 88, wire 91, switch 70, and wire 73 to the current transformer. Under these conditions, all of the current coils of the wattmeters A, B and C are in series with each other and in series with phase A. Under such conditions at least one of the wattmeters should give a negative indication. In order to obtain the proper data, the switches 46, 47 and 48 that correspond to the wattmeter giving the negative indication should be reversed to negative and readings taken of the three wattmeters indicating whether the readings are positive or negative depending upon whether it has a switch 46, 47 and 48 in the positive or negative position.

After these readings are made, the movable contact arm S' of the switch S is moved to position where it is in contact with the terminal 88. In this position the current coils of the wattmeters are still in series with each other but are now put in series with the phase B. A similar set of readings are taken under these conditions, again taking care to reverse the polarity of the potential coil of the wattmeter that happens to give a negative reading initially.

After these readings are taken, the movable switch arm S' is moved to contact with the terminal arm 89 which passes current coils in series with phase C and a similar set of readings are taken.

Interpreting results.

With few exceptions, the above information is sufficient for the engineer at the office to prove the meter is connected properly or improperly. When these exceptions occur, it will be known from the diagram, and a little further investigation will clear up that particular case.

Following are listed the only three different combinations of incorrect connections that may give positive readings on all three meters under (2) of the routine test.

(1) The three potential or current leads shifted so as to advance or retard the phase relation 120° at both elements of the watthour meter. (This change may be produced by wrong connections in either or both the primary and secondary circuits. Such connections are not likely to exist because the watthour meter will reverse whenever the power factor is higher than .866 for either a lagging or leading current.)

(2) The three potential or current leads advanced or retarded, as in case (1), with the additional errors of having the polarity of both meter elements reversed. This reversal may be due to potential or current on either the primary or secondary side. It is quite possible for this condition to exist because the watthour meter can run forward for any possible lagging or leading (not both) power factor, and the meter may speed up as the real power factor drops. This erroneous connection is symmetrical in effect, has exactly the same result at the meter as lagging or leading the current 60°, and is therefore hard to detect from actual power factor shift due to the load.

(3) Any two of the three potential or current leads interchanged, and the polarity of one of the instrument transformers reversed.

The above mentioned are the only three conditions that cannot be detected under (2) of the routine test. These conditions are covered, however, under tests (3), (4), (5), (6) and (7).

To explain the method used in such conditions, it will be necessary to take several cases and analyze them.

Figure 10:
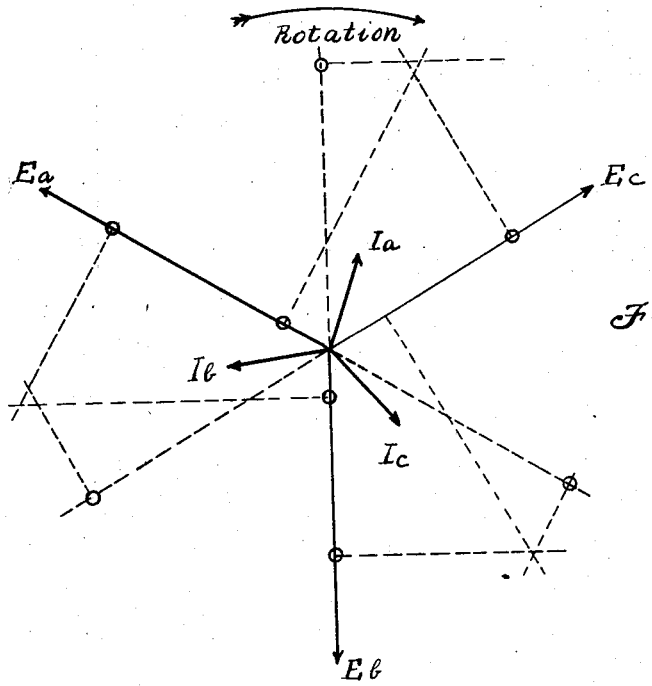

*Case (1).*—In Figure 10 is the vector diagram of such a connection. It is known that $E_a$ and $I_a$ are connected to the upper element of the watthour meter and therefore should be connected to the same phase. But the diagram shows $I_a$ to be leading $E_a$, while it is known the load consists of induction motors and the relations must be lagging. With such a diagram it is evident the meter is not connected properly as $I_a$ belongs where $I_b$ is found.

The data upon which this vector diagram is based were obtained by tests (3), (4) and (5) and

| Current A=3.08 amperes | Current B=3.22 amperes | Current C=3.00 amperes |
|---|---|---|
| Potential A+ 30<br>Potential B−167<br>Potential C+137 | Potential A+148<br>Potential B+ 27<br>Potential C−167 | Potential A−163<br>Potential B+120<br>Potential C+ 40 |

Case (2).—Figure 11 is a diagram found for this wrong connection. It is found that $I_a$ and $E_a$ are tied to the upper element and should connect to the same phase, but this cannot be the case because $I_a$ is leading $E_a$. After a little study of the diagram it is obvious that the current marked $I_c$ should be reversed and tied up with $E_a$ to rectify the error. As the conditions are symmetrical, similar changes would have to be made for the other two phases.

The data upon which this diagram is based were obtained by tests (3), (4), and (5) and are as follows:

| Current A=3 amperes | Current B=3 amperes | Current C=3 amperes |
|---|---|---|
| Potential A+172<br>Potential B−140<br>Potential C− 22 | Potential A− 48<br>Potential B+191<br>Potential C−139 | Potential A−146<br>Potential B− 44<br>Potential C+170 |

Case (3).—In Figure 12 is a diagram of a case as in (3). This was a synchronous motor load. The diagram will not require much inspection to show that the meter is not properly connected because we know the synchronous motor takes a balanced load. It would not be necessary to know anything about the power factor to determine there is something wrong, and if the power factor is known to be lagging or leading, one could determine the nature of the fault from the diagram.

The diagram of Figure 12 is based upon the following data obtained by tests (3), (4) and (5):

| Current A=5.7 amperes | Current B=3.4 amperes | Current C=3.2 amperes |
|---|---|---|
| Potential A 272<br>Potential B−320<br>Potential C  96 | Potential B− 84<br>Potential B 208<br>Potential C−118 | Potential A−192<br>Potential B  116<br>Potential C  68 |

Occasionally a condition is met where the results are not so obvious. Following are some such conditions.

Figure 13:
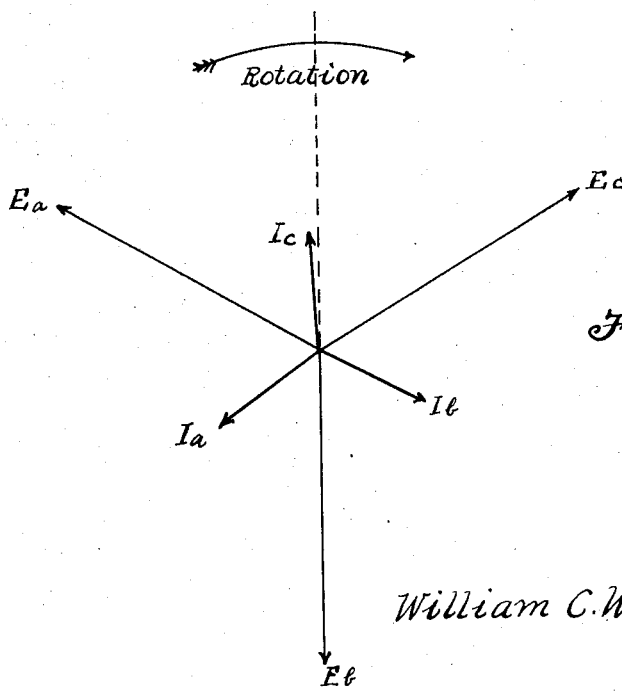
Figure 13 is a vector diagram under conditions where the load consists of apparatus taking the lagging power factor of less than 50 per cent.

(a) Where the load consists of induction apparatus or induction motors which take a lagging power factor less than 50%. The reason for this is seen by referring to Figure 13. This is a vector of an induction motor load. It is seen that the current $I_c$ lags more than 60° behind the voltage $E_c$; therefore it bears a lagging relation to both $E_c$ and $-E_b$. Such being the case, one is not positive that $I_c$ should be tied to $E_c$ at the meter, because if all potentials should be reversed and we tie $I_a$ and $-E_b$ together at the meter, we will still have a forward rotation of the meter with indication of nearly unity power factor. (It is understood that similar symmetrical changes are to be considered on the other two phases). However, upon inspection of the load conditions, one can usually tell if the power factor is near unity or below 50%. In this particular case the answer was that an induction motor would not have as high a power factor as the relation indicated between $I_c$ and $-E_b$, therefore $I_c$ should be tied to $E_c$. As this was known to be the case, the connection was proven to be correct.

When a vector of this nature is found and one cannot make certain by inspections of the load that the power factor is low or high for an induction motor, it is advisable to make a test with only one large motor in operation. In which case the motor can be operated at full or no load. It must be kept in mind that at no load the power factor is a few degrees below 60° lag and at full load it will lag at least 20°.

When making a survey on induction loads, very few cases are found where the power factor is less than 50%, and it is usually very little trouble to ascertain that the power factor is low from the load conditions. When the power factor is above 50%, it is not necessary to know anything about the power factor because in that case the current vector will bear a lagging relation only to the potential to which it should be connected.

(b) When the load consists of synchronous motors, it is necessary to know something about the power factor. Most synchronous motors are of large capacity and are equipped with power factor meters. Others have no power factor meters, but have a D. C. ammeter in the field circuit. From the name-plate data and field current reading, one can ascertain if the current is lagging or leading the voltage. A synchronous motor installation in which there is no means of ascertaining the power factor, is surely a poor installation; but if one should find such conditions, there will be no serious difficulty in making a connection test, provided the field current can be adjusted. To do this, lower the field current until the load current starts to rise. The rheostat should be marked and the operation repeated several times in order to be sure the change in load current was not due to a change in load. Since the increase in load current is due to a weak field, it is apparent that the motor is taking a lagging power factor. With the weak field setting, make a vector diagram test and the results should show a lagging power factor. If the results should show a leading power factor or unbalanced condition, the meter is improperly connected.

It will be seen, therefore, that by the aid of the apparatus disclosed herein, a routine electrician may perform a series of standardized tests and observations which are utilized for the construction of a vector diagram. The vector diagram may then be interpreted in the manner shown so as to ascertain whether or not there are any defects in the connections and to ascertain the nature of such defects. The connections in the present apparatus are made entirely with the watthour meter or the low side of the instrument transformers and the like is not interferred with and the operation of the load apparatus is not interfered with.

Having described my invention, I do not wish to be limited to the specific embodiment thereof shown in the present application, as the same apparatus may be used in checking connections for relays which work upon the watthour meter principle, also the same being capable of variations and modifications to suit the different classes of three phase circuits and three phase meters, within the spirit of the appended claims.

While in the drawings as well as in the specification a metering system is disclosed in which eight lines are run from the transformers to the watthour meters, in practice the number of lines are frequently reduced to six. In such system the two current carrying circuits have a common return wire and the two potential circuits also have a common return wire. In some instances all the circuits have one common return wire with the result that a total of only five lines are run from the transformers to the watthour meters.

While in the present disclosure the generator which constitutes the source of current for the distribution system is shown as a delta generator, it is understood that the system also applies to any distributing system in which the generator is either a delta or a star wound machine.

The invention claimed is:

1. In a three-phase high tension metering system comprising two potential transformers, two current transformers, and a three-phase watthour meter; a testing system for checking the connections of the transformers and the watthour meter comprising three single phase wattmeters.

2. In a three-phase high tension metering system comprising two potential transformers, two current transformers, and a three-phase watthour meter; a testing system for checking the connections of the transformers and the watthour meter comprising three single phase wattmeters having their potential coils connected in star across the secondary windings of the potential transformers, and a phase sequence indicator.

3. In a three-phase high tension metering system comprising two potential transformers, two current transformers, and a three-phase watthour meter; a testing system for checking the connections of the transformers and the watthour meter comprising three single phase wattmeters and means whereby current coils of said wattmeters may be connected in series with each other and in series with any one phase.

4. In a three-phase high tension metering system comprising two potential transformers, two current transformers, and a three-phase watthour meter; a testing system for checking the connections of the transformers and the watthour meter comprising three single phase wattmeters having their potential coils connected in star and to the potential transformers, and means whereby the polarity of any one potential coil may be reversed.

5. In a three-phase high tension metering system comprising two potential transformers, two current tranformers, and a three-phase watthour meter; a testing system for checking the connections of the transformers and the watthour meter comprising three single phase wattmeters having their potential coils connected in star across the potential transformers, and means whereby the three current coils may be connected in series with any one phase.

6. In a three-phase high tension metering system comprising two potential transformers, two current transformers, and a three-phase watthour meter; a testing system for checking the connections of the transformers and the watthour meter comprising three single phase wattmeters having their potential coils connected across the secondaries of the potential transformers, and means whereby the polarity of said coils may be reversed.

7. In a three-phase high tension metering system comprising two potential transformers, two current transformers, and a three-phase watthour meter; a testing system for checking the connections of the transformers and the watthour meter comprising three single phase wattmeters having their potential coils connected across the secondaries of the potential transformers and means whereby the current coils may be connected in series with any one phase or in star across all three phases.

8. In a three-phase high tension metering system comprising two potential transformers, two current transformers, and a three-phase watthour meter; a testing system for checking the connections of the transformers and the watthour meter comprising three single phase wattmeters, means for connecting the potential coils of said wattmeters to the potential transformers, one across each phase, and for reversing the polarity of any one or more of said coils when desired, and means whereby the current coils of said wattmeters may be connected in series with any one phase or in star across all three phases.

9. In a three-phase high tension metering system comprising two potential transformers, two current transformers, and a three phase watthour meter; a testing system for checking the connections of the tranformers and the watthour meter comprising three single phase wattmeters and means whereby the wattmeters may be connected to the watthour meter for checking the connections of the watthour meter and the instrument transformers.

10. A method for checking the connections of a watthour meter and instrument transformers in a high tension three phase metering system comprising the steps of connecting three single phase wattmeters with the potential coils of said wattmeters connected in star across the potential coils of the watthour meters, connecting the current coils in star, each coil being connected in the phase corresponding to its cooperating potential coil and taking the readings of the three wattmeters.

11. A method for checking the connections of a watthour meter and instrument transformers in a high tension three phase metering system comprising the steps of connecting three single phase wattmeters with the potential coils of said wattmeters connected in star across the potential coils of the watthour meters, connecting the current coils in series with each other, and in series with each phase successively and taking readings of the wattmeters at each connection.

12. A method for checking the connections of a watthour meter and instrument transformers in a high tension three phase metering system comprising the steps of connecting three single phase wattmeters with the potential coils of said wattmeters connected in star across the potential coils of the watthour meters, connecting the current coils in series with each other, and in series with each phase successively and taking readings of the wattmeters at each connection, and preparing a vector diagram of the data obtained.

13. A method for checking the connections of a watthour meter and instrument transformers in a high tension three phase metering system comprising the steps of connecting three single phase wattmeters with the potential coils of said wattmeters connected in star across the potential coils of the watthour meters, connecting the current coils in star, each coil being connected in the phase corresponding to its cooperating potential coil, reversing polarity of the potential coil of a meter giving a negative indication and taking the readings of the three wattmeters.

14. A method for checking the connections of a watthour meter and instrument transformers in a high tension three phase metering system comprising the steps of connecting three single phase wattmeters with the potential coils of said wattmeters connected in star across the potential coils of the watthour meters, connecting the current coils in series with each other, and in series with each phase successively reversing polarity of the potential coil of a meter giving a negative indication and taking readings of the wattmeters at each connection.

15. A method for checking the connections of a watthour meter and instrument transformers in a high tension three phase metering system comprising the steps of connecting three single phase wattmeters with the potential coils of said wattmeters connected in star across the potential coils of the watthour meters, connecting the current coils in series with each other, and in series with each phase successively reversing polarity of the potential coil of a meter giving a negative indication and taking readings of the wattmeters at each connection, and preparing a vector diagram of the data obtained.

16. An apparatus for checking the connections of a three phase metering system comprising three single phase wattmeters, each wattmeter comprising a potential coil and a current coil, means for connecting said wattmeters to a three-phase watthour meter, said means comprising a double pole double throw switch for each potential coil, and two three-pole double throw switches for controlling the connections of the current coils, a rotary switch, and a phase sequence indicator.

17. An apparatus for checking the connections of a three phase metering system comprising three single phase wattmeters, each wattmeter comprising a potential coil and a current coil, means for connecting said wattmeters to a three-phase watthour meter, said means comprising a double pole double throw switch for each potential coil, and means for connecting the current coils of said wattmeters in star or in series.

18. An apparatus for checking the connections of a three phase metering system, comprising three single phase wattmeters, and means for variably connecting said wattmeters to the metering system without interfering with the operation of the load.

19. A method of ascertaining the connections of a three phase metering system comprising the steps of connecting a plurality of single phase wattmeters to the watthour meter, one wattmeter for each phase, observing the readings of said wattmeters, connecting the current coils of the wattmeters in series with each phase successively, and observing the indications of said wattmeters in each connection.

20. A method of ascertaining the connections of a three phase metering system comprising the steps of connecting a plurality of single phase wattmeters to the watthour meter, one wattmeter for each phase, observing the readings of said wattmeters, connecting the current coils of the wattmeters in series with each phase successively, and observing the indications of said wattmeters in each connection and constructing a vector diagram based on said observation.

In testimony whereof I affix my signature.

WILLIAM COWPER WOODSON, Jr.